(12) United States Patent
Konrad

(10) Patent No.: US 11,022,682 B2
(45) Date of Patent: Jun. 1, 2021

(54) SIMULATION APPARATUS FOR A ROTATING LIDAR LIGHT MEASUREMENT SYSTEM

(71) Applicant: Konrad GmbH, Radolfzell (DE)

(72) Inventor: Michael Konrad, Radolfzell (DE)

(73) Assignee: Konrad GmbH, Radolfzell (DE)

( * ) Notice: Subject to any disclaimer, the term of this patent is extended or adjusted under 35 U.S.C. 154(b) by 341 days.

(21) Appl. No.: 15/983,208

(22) Filed: May 18, 2018

(65) Prior Publication Data
US 2018/0356503 A1     Dec. 13, 2018

(30) Foreign Application Priority Data
May 18, 2017   (DE) ..................... 10 2017 110 794.0

(51) Int. Cl.
*G01S 7/497* (2006.01)
*G01S 17/08* (2006.01)
*G01S 7/481* (2006.01)
*G01S 17/42* (2006.01)

(52) U.S. Cl.
CPC ............ *G01S 7/497* (2013.01); *G01S 7/4817* (2013.01); *G01S 17/08* (2013.01); *G01S 17/42* (2013.01)

(58) Field of Classification Search
CPC ........ G01S 7/497; G01S 7/4817; G01S 17/08; G01S 17/42

USPC ....................................................... 356/4.02
See application file for complete search history.

(56) References Cited

FOREIGN PATENT DOCUMENTS

| DE | 3908273 C1 | 5/1990 |
|----|------------|--------|
| DE | 102007057372 A1 | 5/2009 |
| EP | 0601872 A1 | 6/1994 |

OTHER PUBLICATIONS

DE 102007057372, English translation of description, downloaded May 29, 2020 from https://worldwide.espacenet.com/publicationDetails/description?CC=DE&NR=102007057372A1&KC=A1&FT=D&ND=3&date=20090528&DB=EPODOC&locale=en_EP#, 14 pp. (Year: 2020).*
European search report for patent Application No. 18173074.8-1206 dated Oct. 16, 2018.

* cited by examiner

*Primary Examiner* — Daniel L Murphy
(74) *Attorney, Agent, or Firm* — Bachman & LaPointe, PC

(57) ABSTRACT

The invention relates to a simulation apparatus for a rotating lidar light measurement system having a lidar light reception sensor (1), wherein the lidar light reception sensor (1) rotates through 360° about a shaft (11), wherein a light transmitter strip (14) is present in the plane of the lidar light reception sensor (1).

16 Claims, 4 Drawing Sheets

SIMULATION APPARATUS FOR A ROTATING LIDAR LIGHT MEASUREMENT SYSTEM

TECHNICAL FIELD

The invention relates to a simulation apparatus and method for a rotating lidar light measurement system.

PRIOR ART

In addition to further applications, lidar (abbreviation for light detection and ranging) light measurement systems are used for optical distance and speed measurement. Lidar light measurement systems emit light and measure the time-of-flight, in which the light returns to the lidar light measurement system after the reflection at an object. The distance of the object from the lidar light measurement system follows from the known speed of light. Depending on the design of a lidar light measurement system, distance measurements in the range of a few centimeters to several hundred thousand kilometers are possible.

Important fields of application for lidar light measurement systems have a measurement range for the distance from approximately 1 m to a few 100 m. Examples of these fields of application include mobile instruments for optical distance measurement and lidar light measurement systems for the automotive field of application, namely for driver assistance systems and autonomous driving.

A method for carrying out measurements at defined distances is required for the test of the lidar light measurement systems, for example within the scope of industrial quality control. In the simplest case, this requires measuring sections of these defined lengths. For quality control purposes, there is also the need of defined ambient conditions in respect of the environment, such as temperature, humidity and stray light along the measuring section, and of defined optical properties of the object to be measured. Observing the ambient conditions represents a significant demand on the spatial requirements for measuring sections. Therefore, it requires much outlay to realize testing sections for distances above a length of approximately 10 m.

If the lidar light measurement system is equipped with a plurality of channels which record an image with an aperture angle in a manner analogous to a conventional camera, there is a further increase in the spatial requirements in comparison with linear distance measurement systems. A measurement space with a diameter of 200 m and a height of 83 m is required for a lidar light reception sensor with a horizontal aperture angle of 360°, a vertical aperture angle of 45° and a maximum measurement distance of 100 m.

In addition to the simple test of lidar light measurement systems at fixed distances, there is the demand on a test system to provide a moving scenery. In particular, this is necessary to test lidar sensors in the application development. By way of example, in order to test the behavior of lidar light measurement systems in the autonomous driving application, it is necessary to carry out runs where sensor data are recorded. However, only this scenery of the performed run can then be tested. Changes which are necessary in the development of the application, for example, require a new measuring run.

Problem of the Invention

It is the problem of the present invention to overcome the disadvantages from the prior art. In particular, the intention is to provide a simulation apparatus which facilitates the function and quality control in a cost-effective manner and which should lead to time being saved in the process.

Solution to the Problem

The features disclosed herein lead to the solution of the problem.

Advantageous configurations are specified herein and in the dependent claims.

The invention allows presenting the lidar light measurement system with any moving scenery. In place of the time-delayed light signal returning to the sensor from the measurement object in the case of a measuring section, the time-delayed light signal is generated by way of an adjustable retardation section.

The light signal emitted by the lidar light measurement system is detected by a photodetector and the further propagation is blocked, for example by way of a light trap. The time of detection of the light signal emanating from the lidar light measurement system is used as a trigger time for producing the time-delayed signal.

A signal that is delayed in time in relation to the trigger is generated. In the invention, the time retardation can be set and modified as desired above a minimum retardation caused by the electronics. The time-delayed signal is produced by means of an electronic time retardation unit. The change in the time retardation is likewise brought about electronically and preferably in a range of $>10 \text{ s}^{-1}$. The time-delayed signal is used to produce a light signal by means of a suitable fast amplifier.

The light signal produced thus is guided onto the lidar light measurement system and interpreted by the latter as an object at a distance corresponding to the retardation time.

Each channel of the lidar light measurement system has such a signal chain that is independent of the other channels. As a result, it is possible to generate a simulated moving environment for the lidar system.

- Producing changeable time-delayed signals that correspond to a moving 1-dimensional to 3-dimensional scene, which is adapted to the scenery in a manner synchronous to the time-of-flight.
- Scalability in the number of channels from one channel up to the resolution of the employed optical system for measuring distances
- Scalability in the distance proceeding from a minimum distance, which is bounded by the reaction speed of the employed electronic components for detecting light pulses via the time retardation members up to the light production, up to the maximum capture range of the optical system.
- Particularly for use in a time-synchronous combination of a plurality of different sensor simulators for visualizing virtual realities.
- Particularly for the field of ADAS (advanced driver assistance systems)
- Adjustability of a static time delay, which corresponds to a static distance.

A simulation apparatus according to the invention for a rotating lidar light measurement system with a lidar light reception sensor is embodied in such a way that the lidar light reception sensor rotates through 360° about a shaft, for example in order to obtain three-dimensional surroundings information in the case of driverless vehicle systems or driver assistance systems and in order to obtain the objects and humans present, and the distance data thereof, in the process. In this way, it is possible to achieve anticipatory driving. In practice, complicated three-dimensional superstructures, which are firstly expensive and secondly time-consuming within the scope of function and quality control, are required for the simulation within the scope of quality and function control, for example. Here, it was found to be advantageous for a light transmitter strip to be present in the plane of the lidar light reception sensor. This light transmitter strip comprises a plurality of first light transmitters that are arranged among themselves in the longitudinal direction of the light transmitter strip. Here, in the plane of the lidar light reception sensor means that the light transmitter strip and the first light transmitters arranged in the light transmitter strip are arranged in such a way that they cover the entire reception range of the light reception sensor at a defined point of rotation of the light reception sensor.

Moreover, a further light transmitter strip is present; it is arranged next to the light transmitter strip in the plane of the lidar light reception sensor, i.e., likewise in the reception range of the lidar light reception sensor.

The signal regularly represents a light signal. The light signal is preferably produced by an LED or a laser diode. Here, the LED comprises an LED driver. The laser diode, in turn, comprises a laser diode driver. A laser diode (also referred to as a semiconductor laser) is a semiconductor component that is related to the light-emitting diode (LED) but produces laser radiation. In laser diodes, a p-n junction with high doping is operated at high current densities. Here, the selection of the semiconductor material determines the emitted wavelength, with a spectrum from infrared to ultraviolet currently being covered.

As described above, the light transmitter strip in this case has a multiplicity of first light transmitters, with the further light transmitter strip likewise having a multiplicity of further light transmitters. In a preferred exemplary embodiment, the light transmitter strip has at least two first light transmitters that are arranged among themselves in the longitudinal direction. Likewise, the further light transmitter strip also has at least two further light transmitters that are arranged among themselves in the longitudinal direction.

The light transmitter strip and the further light transmitter strip are comprised in the light strip cylinder, with the light strip cylinder being arranged in the same plane of the lidar light reception sensor, i.e., in the reception region of the lidar light reception sensor, and enclosing the rotating lidar light reception sensor through 360° in the process. As a result, a gap-free exposure of the lidar light reception sensor is ensured at each point of rotation.

Further, a computer which controls the lidar light reception sensor is present. The computer determines the activation of the lidar light reception sensor and moreover coordinates the actuation of the first light transmitter and of the further light transmitter, and consequently also the time interval between activation of the light reception sensor and the two light transmitters. In the process, the computer also registers whether the light reception sensor is operating correctly and is dividing the different time intervals into corresponding spatial distances. In the meantime, the lidar light reception sensor rotates along the inner surface of the light strip cylinder and it is exposed either by individual light transmitters or by all light transmitters, for example of the one light transmitter strip.

Here, the computer thus serves to monitor and control the enablement of the light reception sensor and the time interval for emitting a light signal, and the selection of the desired first light transmitter or of the further light transmitter of the further light transmitter strip, with the signal input of the light signal from the first light transmitter or the further light transmitter likewise being registered.

In another preferred exemplary embodiment, a lidar light signal of a lidar light transducer is activated in the light transmitter and/or further light transmitter by an amplifier, a comparator, a retardation member and an LED driver or a laser diode driver an LED or of a laser diode. As a result, separate light sources are no longer required. Rather, the lidar light signal can be forwarded into the light transmitter or the further light transmitter depending on requirements and also on the desired time interval between emission and reception. Here, the retardation member, for example, is tasked with the object of forwarding the emitted lidar light signal only after a defined time for said light signal to be guided back to the light reception sensor again.

Further, the light transmitter strip and the further light transmitter strip are aligned next to one another in the static light strip cylinder with a circumference up to 360°, aligned centrically with respect to a rotation head in which the lidar light reception sensor is received. In addition to the light transmitter strip and the further light transmitter strip, it is possible to arrange an undefined number of other light transmitter strips next to one another in the same plane. In this way, it is possible to obtain an image of the surroundings to be detected that is as complete as possible.

Further is a method for simulating a detection environment for a rotating lidar light reception sensor having a light transmitter strip and a further light transmitter strip that is attached next to the light transmitter strip in the same plane, wherein each of the light transmitter strips has a first light transmitter and a second light transmitter in each case, characterized by the following steps:

the lidar light reception sensor is activated,
one or more of the light transmitters of the light transmitter strip emits a light signal after a defined time,
the lidar light reception sensor registers the light signal.

Further is one or more of the light transmitters of the further light transmitter strip emits a further light signal after the activation or a further activation of the lidar light reception sensor.

Here, the lidar light signal of a lidar light transducer is guided here by a photodetector, an amplifier, a comparator and a retardation member into an LED driver or a laser diode driver and the LED driver subsequently activates an LED or the laser diode driver subsequently activates a laser diode in an optical system.

On account of the high rotational speed of the rotation head and the high speed of the emitted, and correspondingly also received, light signals, it was found to be advantageous for all light transmitter strips to emit their light signals together in a defined manner. In this way, there is no need for complicated detection of the current position of the lidar light reception sensor in order to drive the correct light transmitter strips.

DESCRIPTION OF THE FIGURES

Further advantages, features and details of the invention will become apparent from the following description of preferred exemplary embodiments and from the drawings, in which.

EXEMPLARY EMBODIMENT

Figure 1:
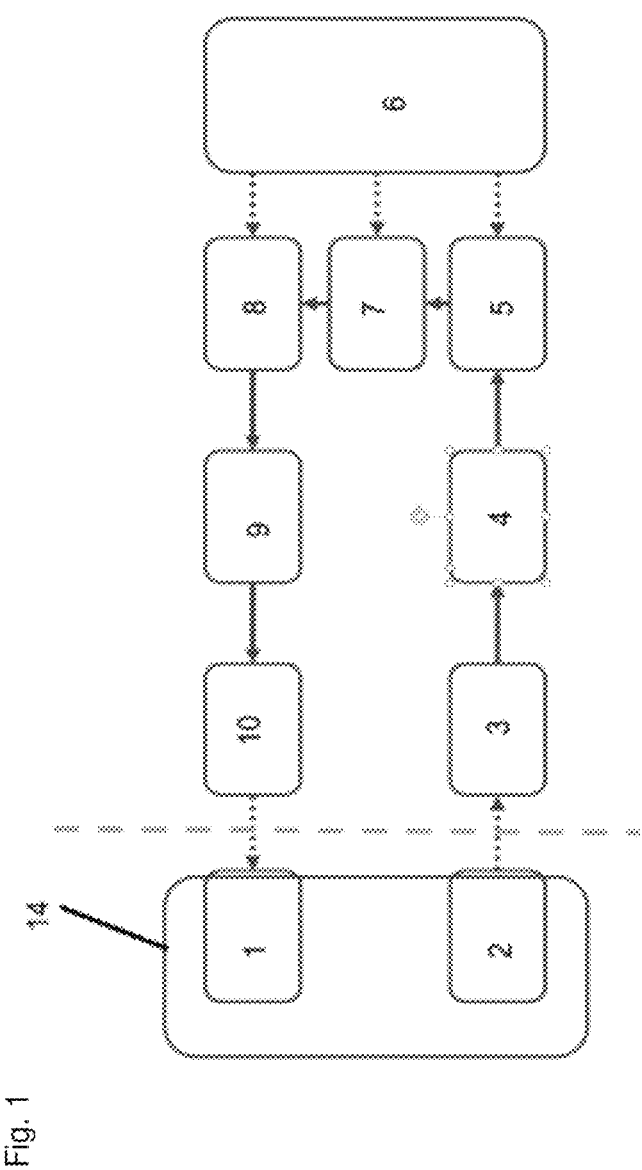
FIG. 1 shows a schematic view of connections.

FIG. 1 shows a schematic view of connections for the exemplary embodiment that is not only used a lidar light reception sensor 1 of a lidar light measurement system 14 but also as a lidar light transducer 2.

In such a case, the emitted lidar light signal of the lidar light transducer 2 is initially guided into a photodetector 3. Electronic components that convert light into an electrical signal using the photoelectric effect or that have an electrical resistance that depends on the incident radiation are referred to as photodetectors, or else as light sensors or optical detectors, optoelectronic sensors. However, the term also denotes applications that have such a radiation-measuring component integrated therein.

The signal recorded by the photodetector 3 is subsequently transmitted to an amplifier 4, which strengthens the signal and amplifies the latter for further processing.

Then, the signal is forwarded into a comparator 5. Here, a computer 6 monitors the comparator 5 and the forwarding of the signal to a retardation member 7, which forwards, with different temporal retardation, the forwarding of the signal to an LED driver 8 in a defined form and in a manner influenced by the computer 6.

The LED driver 8 or a laser diode driver, not shown, in turn brings an LED 9 or a laser diode, not shown, for emitting the signal in an optical system 10 to shine. After the signal was converted into a light signal by the LED 9 in the optical system 10, the lidar light reception sensor 1 receives the light signal of the optical sensor 10.

Figure 2:
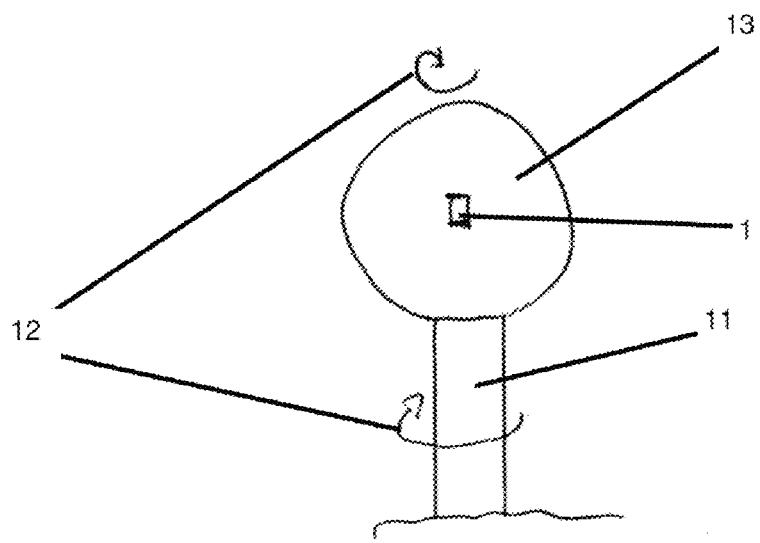
FIG. 2 shows a schematic view of part of the simulation apparatus according to the invention.

FIG. 2 shows a rotation head 13, in which the lidar light reception sensor 1 is held in co-rotating fashion. Moreover, a shaft 11, on which the rotation head 13 is seated, is shown.

Additionally, the two rotation arrows 12 show the direction of rotation in this exemplary embodiment.

Figure 3:
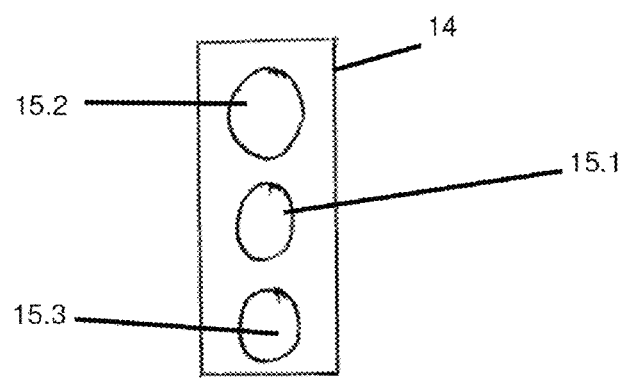
FIG. 3 shows a schematic view of a further part of the simulation apparatus according to the invention.

FIG. 3 shows the light transmitter strip 14. How a first light transmitter 15.1 is arranged in the side of the light transmitter strip 14 that normally faces the rotation head 13 and also how additional other first light transmitters 15.2, 15.3 are arranged below and above the central first light transmitter 15.1 can clearly be seen.

Figure 4:
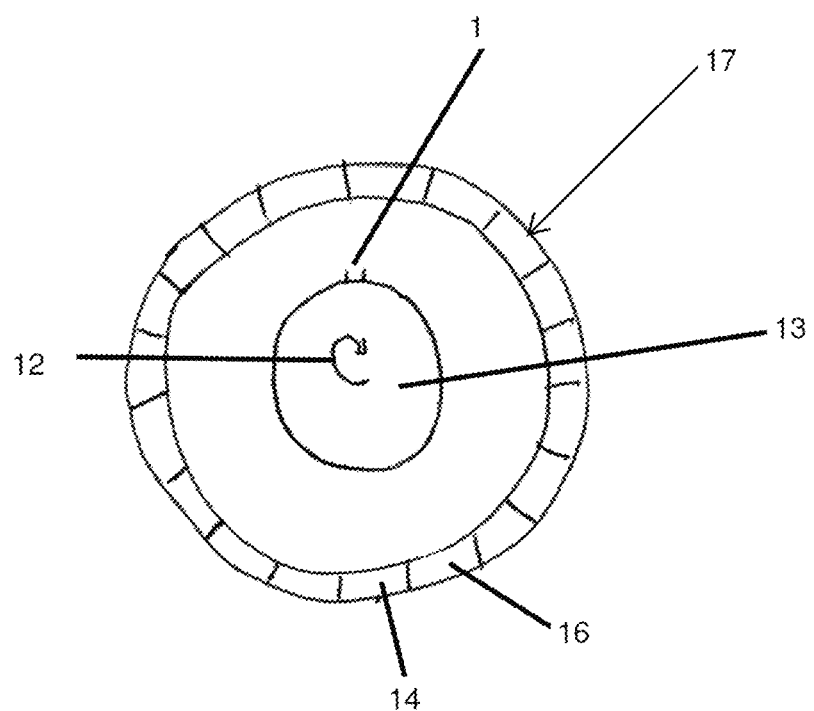
FIG. 4 shows a plan view of the simulation apparatus according to the invention.

FIG. 4 shows a plan view of a simulation apparatus according to the invention. There, the rotation head 13, which rotates in the direction of the rotation arrow 12, is shown in the center of a light strip cylinder 17.

Here, the light strip cylinder 17 consists of the light transmitter strip 14 and the further light transmitter strip 16 and further light transmitter strips that have not been described but are visible in FIG. 4, which together close the circle around the rotation head 13 in order to be able to simulate a 360° environment.

Even though only one/some preferred exemplary embodiment/embodiments of the invention was/were described and presented, it is obvious that a person skilled in the art can add numerous modifications without departing from the essence and scope of the invention.

Figure 5:
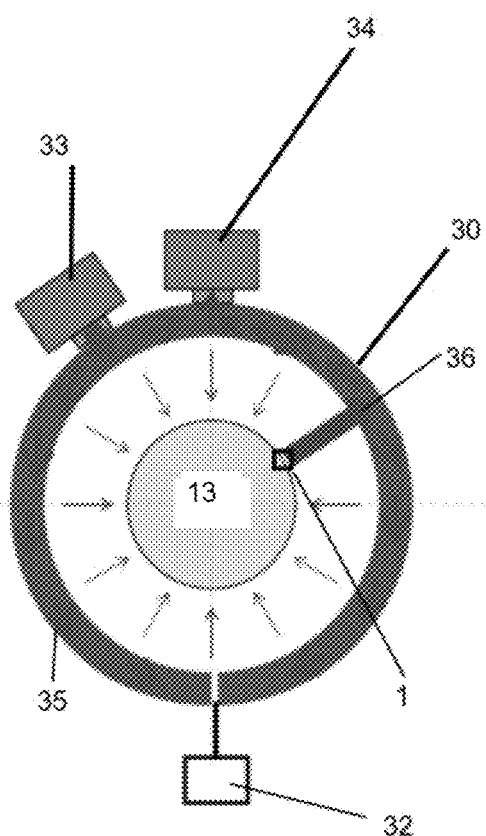
FIGS. 5 and 6 show a further exemplary embodiment.
Figure 6:
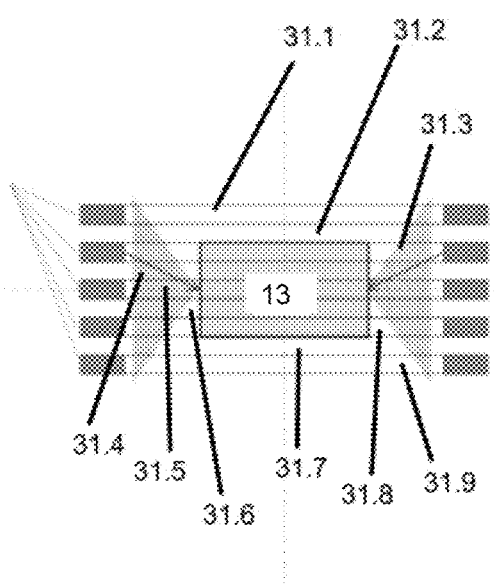

FIGS. 5 and 6 show a further exemplary embodiment. Here, FIG. 5 shows the view from the top and FIG. 6 shows a cut side view. Both figures show the rotation head 13 again, said rotation head likewise being arranged rotating through 360°.

The rotation head 13 is surrounded by a light ring 30 in FIG. 5. The light ring 30 can be produced from plastics in a 3D printing method. The light ring 30 consists of a multiplicity of rings 31.1-31.9, which lie above one another and which are shielded from one another in a light-tight manner.

FIG. 5 moreover shows a zero degrees alignment 32. When the light reception sensor 1 passes through the zero degrees alignment 32, the signal of passing through the zero degrees alignment 32 is communicated to the computer, and so the actual position of the light reception sensor 1 is always ascertainable on account of the rotational speed of the rotation head 13 and the instant of passing through the zero degrees alignment 32. Consequently, it is possible to ascertain the position of the light reception sensor 1 depending on the time that has elapsed since passing through the zero degrees alignment 32 and the rotational speed. This is possible precisely depending on when a transmitter 33 emits a transmitter light, in this case in the form of the transmitter light arrow 35, wherein the transmitter light propagates in the entire light ring 30 and it is visible to the light reception sensor 1. Once again, a receiver return signal 36 is emitted in the respective position of the light reception sensor 1, said receiver return signal being detected by a receiver 34.

In this way, it is possible to ascertain a detection of the position and the functionality of the light reception sensor 1.

LIST OF REFERENCE SIGNS

| | |
|---|---|
| 1 | Lidar light reception sensor |
| 2 | Lidar light transducer |
| 3 | Photodetector |
| 4 | Amplifier |
| 5 | Comparator |
| 6 | Computer |
| 7 | Retardation member |
| 8 | LED driver |
| 9 | LED |
| 10 | Optical system |
| 11 | Shaft |
| 12 | Direction of rotation |
| 13 | Rotation head |
| 14 | Light transmitter strip |
| 15 | First light transmitter |
| 16 | Further light transmitter strip |
| 17 | Light strip cylinder |
| 30 | Light ring |
| 31 | Ring |
| 32 | Zero degrees alignment |
| 33 | Transmitter |
| 34 | Receiver |
| 35 | Transmitter light arrow |
| 36 | Receiver return signal |

The invention claimed is:

1. Simulation apparatus for a rotating lidar light measurement system having a lidar light reception sensor (1), wherein the lidar light reception sensor (1) is rotatable through 360° about a shaft (11), wherein a light transmitter strip (14) is present in the plane of the lidar light reception sensor (1).

2. Simulation apparatus according to claim 1, wherein a further light transmitter strip (16) is arranged next to the light transmitter strip (14) in the plane of the lidar light reception sensor (1).

3. Simulation apparatus according to claim 2, wherein the light transmitter strip (14) has a first light transmitter (15.1, 15.2, 15.3) and the further light transmitter strip (16) has a further light transmitter.

4. Simulation apparatus according to claim 3, wherein the light transmitter strip (14) has at least two first light transmitters (15.1, 15.2, 15.3) that are arranged among themselves in the longitudinal direction.

5. Simulation apparatus according to claim 3, wherein the further light transmitter strip (16) has at least two further light transmitters that are arranged among themselves in the longitudinal direction.

6. Simulation apparatus according to claim 2, wherein the light transmitter strip (14) and the further light transmitter strip (16) are comprised in a light strip cylinder (17), wherein the light strip cylinder (17) is arranged in the same plane of the lidar light reception sensor (1).

7. Simulation apparatus according to claim 6, wherein the light strip cylinder (17) is arranged in a reception region of the lidar light reception sensor (1).

8. Simulation apparatus according to claim 2, wherein a computer (6), which controls the lidar light reception sensor (1), is present.

9. Simulation apparatus according to claim 8, wherein the computer controls the light transmitter strip and the further light transmitter strip and controls the comprised first light sensors and further light sensors.

10. Simulation apparatus according to claim 8, wherein the computer monitors the enablement of the lidar light reception sensor and the time interval for emitting a light signal by way of the light transmitter strip and/or the further light transmitter strip and registers the signal input of the light signal from the activated light transmitter strip or the further light transmitter strip.

11. Simulation apparatus according to claim 2, wherein the further light transmitter strip (16) is arranged in a reception region of the lidar light reception sensor (1).

12. Simulation apparatus according to claim 1, wherein a lidar light signal from a lidar light transducer (2) is activatable in the first light transmitter and/or further light transmitter by an amplifier (4), a comparator (5), a retardation member (7) and an LED driver (8) an LED (9) or a laser diode driver of a laser diode.

13. Simulation apparatus according to claim 1, wherein the first light transmitter and/or the further light transmitter are aligned statically in a holder in a circumference of up to 360°, centrically with respect to a rotation head (13) in which the lidar light reception sensor (1) is comprised.

14. Method for simulating a detection environment for a rotating lidar light reception sensor (1) having a light transmitter strip and a further light transmitter strip that is attached next to the light transmitter strip in the same plane, wherein the lidar light reception sensor (1) is rotatable through 360° about a shaft (11), and wherein each of the light transmitter strips has a first light transmitter and a second light transmitter in each case, comprising the following steps:

the lidar light reception sensor (1) is activated, one or more of the light transmitters of the light transmitter strip emits a light signal after a defined time, and the lidar light reception sensor (1) registers the light signal.

15. Method according to claim 14, wherein one or more of the light transmitters of the further light transmitter strip emits a further light signal after the activation or a further activation of the lidar light reception sensor (1).

16. Method according to claim 14, wherein a lidar light signal of a lidar light transducer (2) is guided through a photodetector (3), an amplifier (4), a comparator (5) and a retardation member (7) into an LED driver (8) and the LED driver (8) is subsequently guided an LED (9) or the retardation member (7) into a laser diode driver and the laser diode driver subsequently activates a laser diode in an optical system (10).

\* \* \* \* \*